(12) United States Patent
Kim et al.

(10) Patent No.: US 8,612,897 B2
(45) Date of Patent: Dec. 17, 2013

(54) IDLE SCREEN ARRANGEMENT STRUCTURE AND IDLE SCREEN DISPLAY METHOD FOR MOBILE TERMINAL

(75) Inventors: Soon Ok Kim, Seoul (KR); Chan Woo Park, Seoul (KR); Seung Hwan Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 921 days.

(21) Appl. No.: 11/949,460

(22) Filed: Dec. 3, 2007

(65) Prior Publication Data

US 2008/0155481 A1 Jun. 26, 2008

(30) Foreign Application Priority Data

Dec. 1, 2006 (KR) .......................... 10-2006-0120878

(51) Int. Cl.
*G06F 3/048* (2013.01)

(52) U.S. Cl.
USPC .......................................................... 715/867

(58) Field of Classification Search
USPC .......................................................... 715/867
See application file for complete search history.

(56) References Cited

U.S. PATENT DOCUMENTS

| | | | |
|---|---|---|---|
| 5,635,954 A * | 6/1997 | Yamada ........................ | 345/157 |
| 7,046,232 B2 | 5/2006 | Inagaki et al. | |
| 7,240,287 B2 * | 7/2007 | Qureshi et al. ................ | 715/730 |
| 7,761,814 B2 * | 7/2010 | Rimas-Ribikauskas et al. ............................ | 715/863 |
| 7,880,728 B2 * | 2/2011 | de los Reyes et al. ........ | 345/173 |
| 2002/0191029 A1 * | 12/2002 | Gillespie et al. .............. | 345/810 |
| 2004/0077340 A1 * | 4/2004 | Forsyth ....................... | 455/414.1 |
| 2004/0201572 A1 * | 10/2004 | Wei .............................. | 345/163 |
| 2005/0024341 A1 * | 2/2005 | Gillespie et al. .............. | 345/173 |
| 2005/0188329 A1 * | 8/2005 | Cutler et al. ................. | 715/804 |
| 2005/0223341 A1 * | 10/2005 | Repka ........................... | 715/851 |
| 2006/0030370 A1 * | 2/2006 | Wardimon .................... | 455/566 |
| 2006/0055662 A1 * | 3/2006 | Rimas-Ribikauskas et al. ............................ | 345/156 |
| 2006/0187204 A1 * | 8/2006 | Yi et al. ........................ | 345/158 |
| 2006/0234696 A1 * | 10/2006 | Cho .............................. | 455/424 |
| 2006/0236266 A1 * | 10/2006 | Majava ......................... | 715/810 |
| 2007/0275736 A1 * | 11/2007 | Baek et al. .................... | 455/457 |
| 2008/0001924 A1 * | 1/2008 | de los Reyes et al. ........ | 345/173 |
| 2008/0153551 A1 * | 6/2008 | Baek et al. .................... | 455/566 |

FOREIGN PATENT DOCUMENTS

| | | |
|---|---|---|
| CN | 1825265 | 8/2006 |
| KR | 1020030087525 | 11/2003 |
| KR | 1020050021627 | 3/2005 |

(Continued)

*Primary Examiner* — William Bashore
*Assistant Examiner* — Henry Orr
(74) *Attorney, Agent, or Firm* — The Farrell Law Firm, P.C.

(57) ABSTRACT

An idle screen arrangement structure and an idle screen display method for a mobile terminal are provided. The idle screen arrangement structure includes a base idle screen; and a plurality of different extended idle screens arranged in four or eight directions around the base idle screen. A first idle screen of the base idle screen and extended idle screens is displayed on the display unit. In response to an input of a screen-switch event, a second idle screen of the base idle screen and extended idle screens different from the first idle screen is displayed instead of the first idle screen. For example, when the pointer is moved into a screen-switch region on the display unit, the first idle screen is switched to the second idle screen. The base and extended idle screens may have shortcuts to particular functions, and be switched one another in a circular or a non-circular manner.

19 Claims, 12 Drawing Sheets

(56) References Cited

FOREIGN PATENT DOCUMENTS

| KR | 1020050091246 | 9/2005 |
|----|---------------|--------|
| KR | 1020060018705 | 3/2006 |
| KR | 1020070027023 | 3/2007 |
| WO | WO 02/05081   | 1/2002 |
| WO | WO 2006/062594 | 6/2006 |

* cited by examiner

IDLE SCREEN ARRANGEMENT STRUCTURE AND IDLE SCREEN DISPLAY METHOD FOR MOBILE TERMINAL

PRIORITY

This application claims priority under 35 U.S.C. §119(a) to an application entitled "IDLE SCREEN ARRANGEMENT STRUCTURE AND IDLE SCREEN DISPLAY METHOD FOR MOBILE TERMINAL" filed in the Korean Intellectual Property Office on Dec. 1, 2006 and assigned Serial No. 2006-0120878, the contents of which are incorporated herein by reference.

BACKGROUND OF THE INVENTION

1. Field of the Invention

The present invention relates generally to a mobile terminal and, more particularly, to an idle screen arrangement structure and an idle screen display method for a mobile terminal that enable easy switching between idle screens associated with particular functions through multi-tasking.

2. Description of the Related Art

Advances in information and communication technologies have enabled popularization of various mobile terminals such as mobile phones, Personal Digital Assistants (PDAs), mobile broadcast receivers and multimedia players.

Mobile terminals display various kinds of information through display units. During an idle state, a mobile terminal displays an idle screen or initial screen on a display unit. Normally, a pre-stored or pre-registered image is used as the idle screen.

The idle screen can be changed by user settings. However, tedious menu operations necessary for changing of the idle screen may cause inconvenience to the user. In addition, the idle screen is limited to a single image or a single function. For example, although the user desires to associate the idle screen with various items such as a photograph, a schedule representation, a universal time representation, and a list of shortcut numbers, the user can associate only one of them with the idle screen.

Currently, items usable as an idle screen have increased in number. For example, a photograph, a schedule representation, a universal time representation, a list of shortcut numbers, a list of shortcut icons, a list of favorite broadcast channels, a user-editable screen (hereinafter, a "my screen"), and a "my pet" game can be used as an idle screen of a mobile terminal.

Because of a small display area, a mobile terminal uses a multi-level tree-structured menu. Traversal of the multi-level menu in search of a particular function may cause inconvenience to a user. In particular, a large number of menu items may cause too much inconvenience to a novice user.

SUMMARY OF THE INVENTION

The present invention has been made in view of the above problems, and the present invention provides an idle screen arrangement structure and an idle screen display method for a mobile terminal that enable easy changing of idle screens.

The present invention also provides an idle screen arrangement structure and an idle screen display method that enhance utilization of an idle screen.

The present invention further provides an idle screen arrangement structure and an idle screen display method that enable effective utilization of a display screen limited in size.

The present invention further provides an idle screen arrangement structure and an idle screen display method that enable easy access to a particular function or menu item.

The present invention further provides an idle screen arrangement structure and an idle screen display method that associate idle-screen switching with multi-tasking.

In accordance with an exemplary embodiment of the present invention, there is provided an idle screen arrangement structure for a mobile terminal having a display unit, including a base idle screen; and a plurality of different extended idle screens arranged in four directions of 'up', 'down', 'left' and 'right' around the base idle screen, wherein a first idle screen of the base idle screen and extended idle screens is displayed on the display unit, and a second idle screen of the base idle screen and extended idle screens different from the first idle screen is displayed instead of the first idle screen in response to an input of a screen-switch event.

In accordance with another exemplary embodiment of the present invention, there is provided an idle screen arrangement structure for a mobile terminal having a display unit, including a base idle screen; a plurality of different first extended idle screens arranged in four directions of 'up', 'down', 'left' and 'right' around the base idle screen; and a plurality of different second extended idle screens arranged in four directions of 'upper left', 'upper right', 'lower left' and 'lower right' around the base idle screen, wherein one of the base idle screen and the first and second extended idle screens is displayed on the display unit, and another one of the base idle screen and the first and second extended idle screens different from the one idle screen is displayed instead of the one idle screen in response to an input of a screen-switch event.

In accordance with another exemplary embodiment of the present invention, there is provided an idle screen arrangement structure for a mobile terminal having a display unit, including a first idle screen arranged at a position (0, 0); at least two second idle screens arranged at positions (x, 0) (x is a non-zero integer); and at least two third idle screens arranged at positions (0, y) (y is a non-zero integer), wherein one of the first to third idle screens is displayed on the display unit, and another one of the first to third idle screens different from the fourth idle screen is displayed instead of the one idle screen in response to an input of a screen-switch event.

In accordance with another exemplary embodiment of the present invention, there is provided an idle screen arrangement structure for a mobile terminal having a display unit, including a plurality of idle screens arranged at positions (x, y) (−m<x, y<m and x, y, m are integers), wherein a first idle screen of the idle screens is displayed on the display unit, and a second idle screen of the idle screens different from the first idle screen is displayed instead of the first idle screen in response to an input of a screen-switch event.

Preferably, the idle screen arrangement structure further includes a pointer that is freely movable and displayed on the display unit. The screen-switch event is generated by movement of the pointer. At least one of the idle screens has a shortcut to a particular function. The idle screens are switched among one another in a circular or a non-circular manner in response to an input of screen-switch events.

In accordance with another exemplary embodiment of the present invention, there is provided an idle screen display method using the idle screen arrangement structure for a mobile terminal having a display unit, including displaying a first idle screen of the idle screens on the display unit; checking whether the pointer is moved into a screen-switch region on the display unit; and if the pointer is moved into the screen-switch region, switching the first idle screen to a second idle screen of the idle screens different from the first idle screen.

The idle screen display method further includes checking whether the pointer remains in the screen-switch region for a preset time duration. If the pointer has remained in the screen-switch region for the preset time duration, the first idle screen is switched to the second idle screen. The idle screen display method further includes after pointer movement into the screen-switch region, checking whether an idle screen is arranged in a direction of the movement of the pointer. If an idle screen is arranged in the direction of movement of the pointer, the first idle screen is switched to the idle screen in the direction. The idle screen display method further includes after idle-screen switching, checking whether the second idle screen has a shortcut to a function; and if the second idle screen has a shortcut to a function, performing the function. The idle screens are switched one another in a circular or a non-circular manner.

In accordance with another exemplary embodiment of the present invention, there is provided an idle screen display method for a mobile terminal having a display unit, using an idle screen arrangement structure having a base idle screen, and a plurality of different extended idle screens arranged in four directions of 'up', 'down', 'left' and 'right' around the base idle screen, the method including displaying a first idle screen of the base idle screen and extended idle screens on the display unit; in response to an input of a screen-switch event, displaying an on-screen direction indicator on the display unit; and in response to a selection of the on-screen direction indicator, switching the first idle screen to a second idle screen of the base idle screen and extended idle screens different from the first idle screen.

The idle screen display method further includes in response to a preliminary selection of the on-screen direction indicator before the selection thereof, displaying a descriptive title of an idle screen arranged in a direction indicated by the on-screen direction indicator. The displaying an on-screen direction indicator further includes displaying descriptive titles of idle screens arranged in four directions around the on-screen direction indicator.

In accordance with another exemplary embodiment of the present invention, there is provided an idle screen display method for a mobile terminal having a display unit, using an idle screen arrangement structure having a first idle screen, and a plurality of different second idle screens arranged in four directions of 'up', 'down', 'left' and 'right' around the first idle screen, the method including displaying an N-th idle screen of the first idle screen and second idle screens on the display unit; performing a first function associated with the N-th idle screen; in response to an input of a direction control key during performance of the first function associated with the N-th idle screen, displaying an M-th idle screen of the first idle screen and second idle screens different from the N-th idle screen on the display unit; and if the first function associated with the N-th idle screen is executable without user intervention, placing the first function in the background, and performing a first function associated with the M-th idle screen.

The idle screen display method further includes in response to an input of a key other than a direction control key during performance of the first function associated with the N-th idle screen, performing a second function associated with the N-th idle screen. The idle screen display method further includes if a top-priority event is detected during execution of a function associated with the N-th or M-th idle screen and the function in execution is executable without user intervention, placing the function in execution in the background, and performing another function related to the top-priority event. Preferably, the top-priority event is one of an incoming call, an incoming message, and an alarm.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF EXEMPLARY EMBODIMENTS

Figure 1:
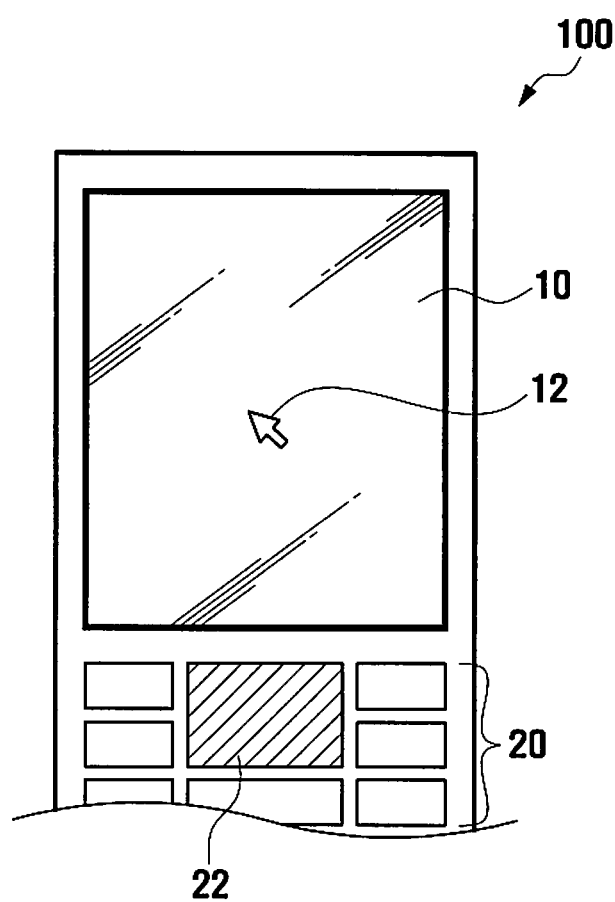
FIG. 1 illustrates a mobile terminal related to the present invention.

Hereinafter, exemplary embodiments of the present invention are described in detail with reference to the accompanying drawings. The same reference symbols identify the same or corresponding elements in the drawings. Detailed descriptions of constructions or processes known in the art may be omitted to avoid obscuring the invention in unnecessary detail.

In the description, a mobile terminal of the present invention is a portable terminal having a display unit, and may be any information and communication appliance or multimedia appliance, such as a mobile communication terminal, a smart phone, a Personal Digital Assistant (PDA), a digital broadcast receiving terminal including a Digital Multimedia Broadcasting (DMB) receiver, and a multimedia player including a Portable Multimedia Player (PMP) and an MP3 audio player.

FIG. 1 illustrates a mobile terminal 100 related to the present invention. The mobile terminal 100 includes a display unit 10 and an input unit 20.

The display unit 10 displays information regarding states and operations of the mobile terminal 100. In particular, the display unit 10 displays an idle screen during an idle mode, in which no menu item is in use and no user application is active. The display unit 10 may include a panel that is composed of display devices such as Liquid Crystal Display (LCD) devices or Organic Light Emitting Diodes (OLED).

The input unit 20 generates an input signal according to a user action. The input unit 20 includes a keypad, a touch pad, and a pointing device 22 such as an optical or a non-optical jog wheel. The user can freely move a pointer 12 on a display screen of the display unit 10 by manipulating the pointing device 22 with the thumb and fingers.

Figure 2A:
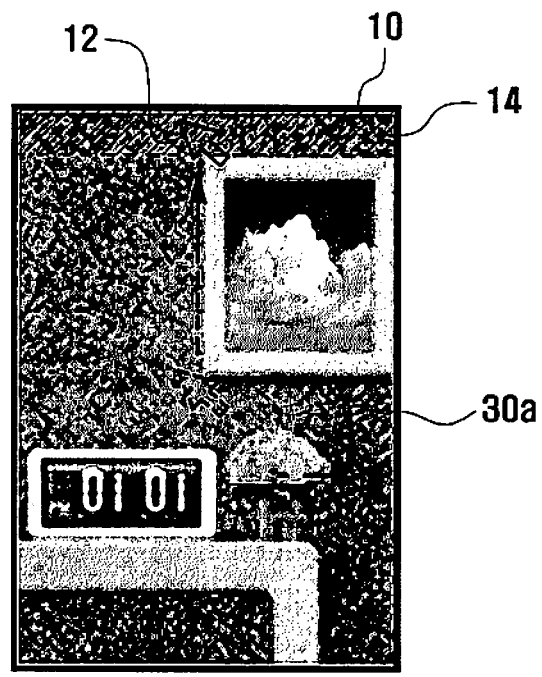
FIGS. 2A and 2B are screen representations illustrating an idle screen display method according to an exemplary embodiment of the present invention.
Figure 2B:
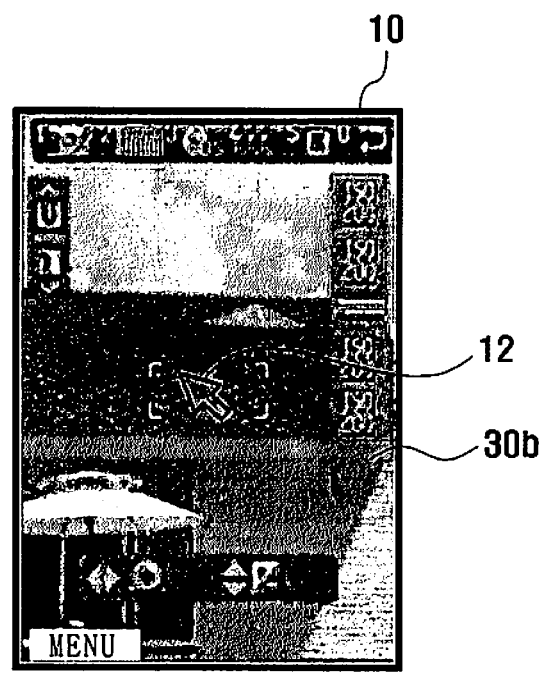

FIGS. 2A and 2B are screen representations illustrating an idle screen display method according to an exemplary embodiment of the present invention.

In FIG. 2A, an idle screen 30a ('my screen') is displayed on the display unit 10 during the idle mode. The idle screen 30a can be easily replaced with another idle screen by manipulating the pointing device 22. That is, movement of the pointer 12 using the pointing device 22 toward a border region on the display screen of the display unit 10 is interpreted as input of a screen-switch event, and the screen-switch event leads to idle screen switching from the current idle screen 30a to another idle screen. In FIG. 2B, a new idle screen 30b (a photographed image) is displayed.

Screen-switch events can be generated in various manners. For example, in FIG. 2A, a screen-switch region 14 is pre-assigned at a border region on the display screen, and placement of the pointer 12 within the screen-switch region 14 is detected as a screen-switch event.

In the present invention, idle screen switching can be performed in four or eight directions, and idle screens can be different from direction to direction. Thereto, a 'base idle screen' is arranged first. Then, different 'extended idle screens' are arranged in four directions of 'up', 'down', 'left' and 'right' around the base idle screen, or in eight directions of 'up', 'down', 'left', 'right', 'upper left', 'upper right', 'lower left', and 'lower right' around the base idle screen. Idle screen switching is easily performed through switching between the base idle screen and one of the extended idle screens or switching between the extended idle screens. The term 'extendable idle screen' refers to the base idle screen and extended idle screens that can be switched among one another.

Figure 3:
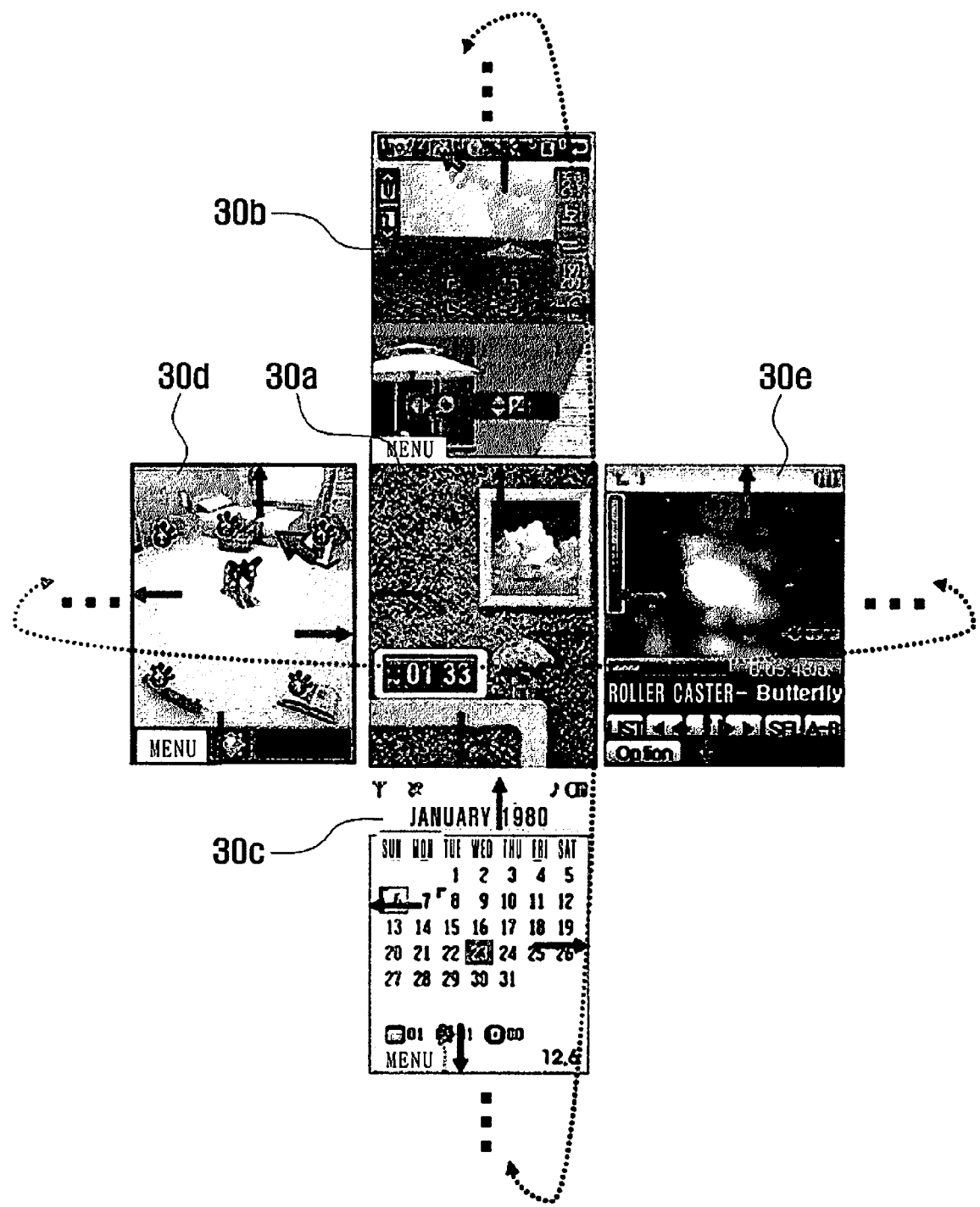
FIG. 3 is another screen representation illustrating the idle screen display method of FIGS. 2A and 2B.

FIG. 3 is another screen representation illustrating the idle screen display method.

In FIG. 3, extended idle screens 30b, 30c, 30d and 30e are arranged in four directions of 'up', 'down', 'left' and 'right' around a base idle screen 30a. For each direction, at least one extended idle screen may be arranged. Idle screen switching between the base idle screen 30a and one of the extended idle screens 30b, 30c, 30d and 30e or between the extended idle screens 30b, 30c, 30d and 30e is performed in response to a screen-switch event generated by, for example, pointer movement.

Idle screens are switched normally in a circular manner. For example, if idle screen switching is performed continuously in the right-handed direction from the base idle screen 30a, the right-most extended idle screen is displayed and then the left-most extended idle screen is displayed. Alternatively, in a non-circular switching, once the right-most extended idle screen is displayed, further idle screen switching in the right-handed direction is not allowed.

Each of the idle screens 30a to 30e may be a simple image or an image having a shortcut to a particular function. For example, the base idle screen 30a (a "my screen"), an extended idle screen 30c (a monthly calendar), an extended idle screen 30d (a "my pet"), a list of photograph albums, a photograph, a schedule representation, and a universal time representation can be an idle screen made of a simple image. The extended idle screen 30b (camera), extended idle screen 30e (music/moving image player), and images having shortcuts to a DMB reception, an electronic dictionary lookup, a text message composition, and a phonebook searching can be idle screens made of an image having a shortcut to a function.

Figure 4A:
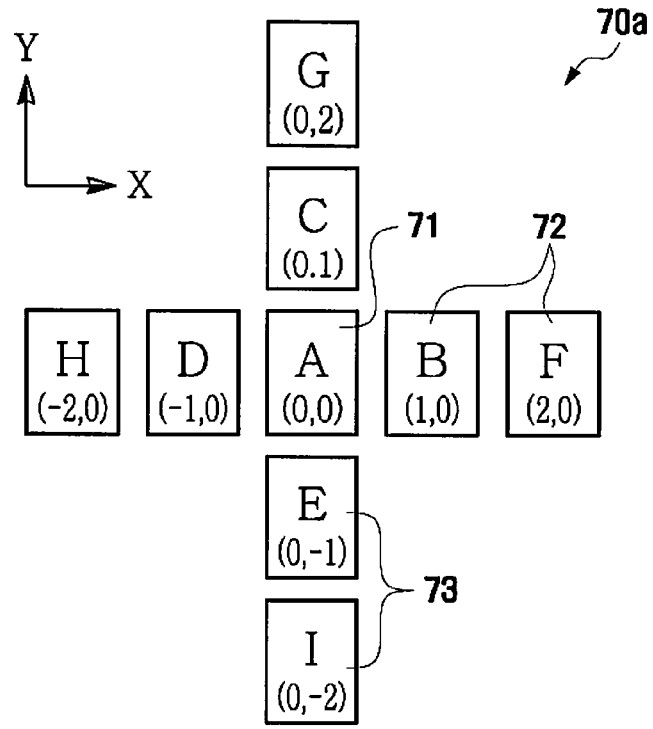
FIGS. 4A and 4B illustrate idle screen arrangement structures according to another exemplary embodiment of the present invention.
Figure 4B:
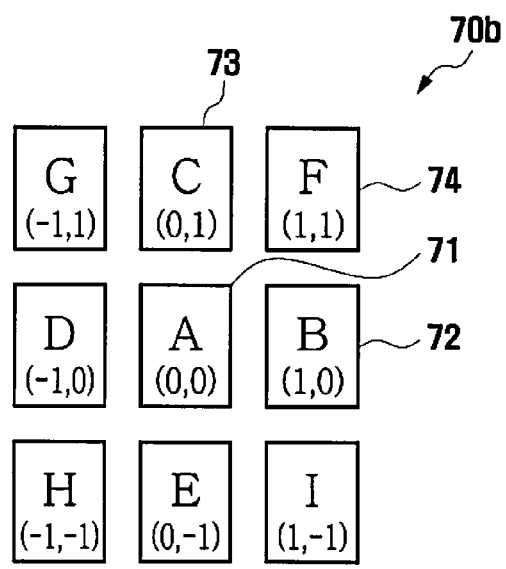

FIGS. 4A and 4B illustrate idle screen arrangement structures according to another exemplary embodiment of the present invention.

Idle screens are arranged in a cross shape in FIG. 4A, and in a grid shape in FIG. 4B. In arrangement structures of FIGS. 4A and 4B, the positions of the idle screens can be identified by their coordinates.

As illustrated in FIG. 4A, the horizontal axis is labeled X, and the vertical axis is labeled Y. The coordinates of a base idle screen 71 are (0, 0). In a cross shape, the coordinates of extended idle screens 72 are given by (x, 0) (x is a non-zero integer), and the coordinates of extended idle screens 73 are given by (0, y) (y is a non-zero integer). In a grid shape in FIG. 4B, the coordinates of idle screens 71, 72, 73 and 74 are given by (x, y) (−m<x, y<m and x, y, m are integers).

FIGS. 5A to 5D illustrate screen switching for the idle screen arrangement structures of FIGS. 4A and 4B.

Figure 5A:
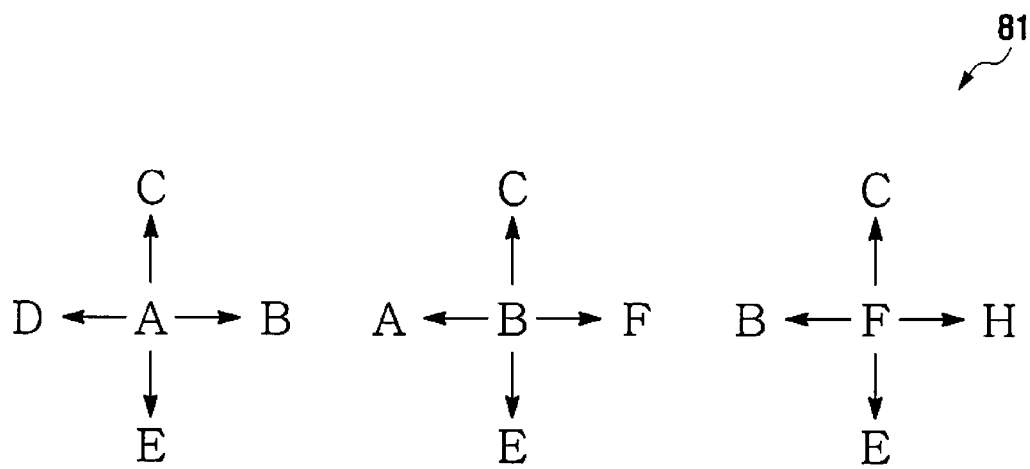
FIGS. 5A to 5D illustrate screen switching for the idle screen arrangement structures of FIGS. 4A and 4B.
Figure 5B:
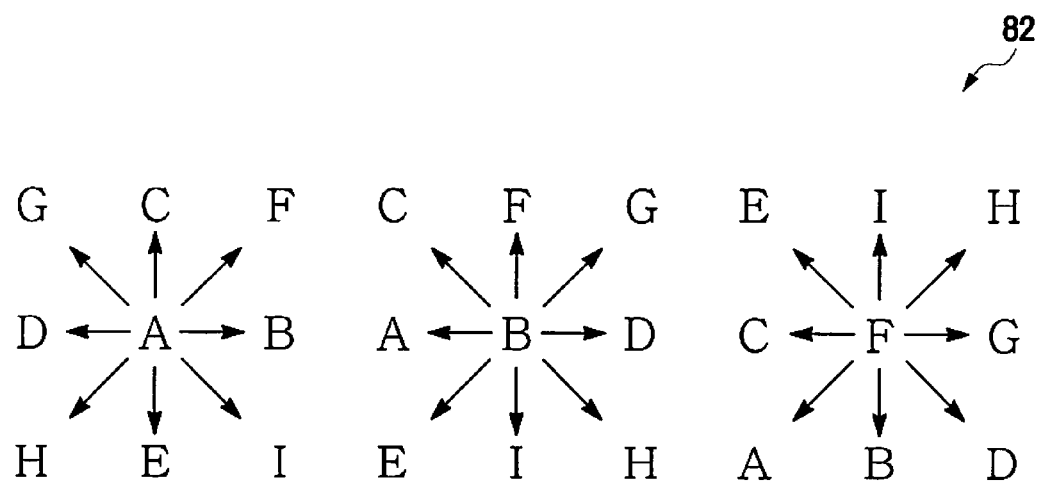
Figure 5C:
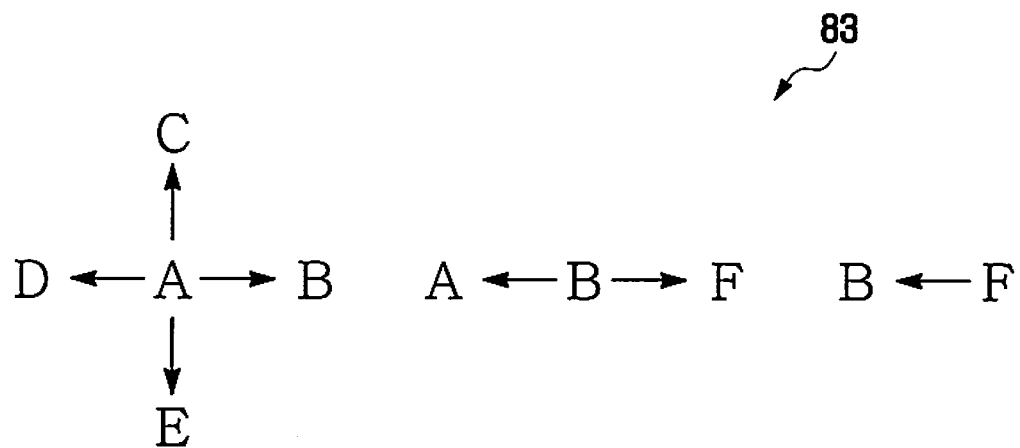
Figure 5D:
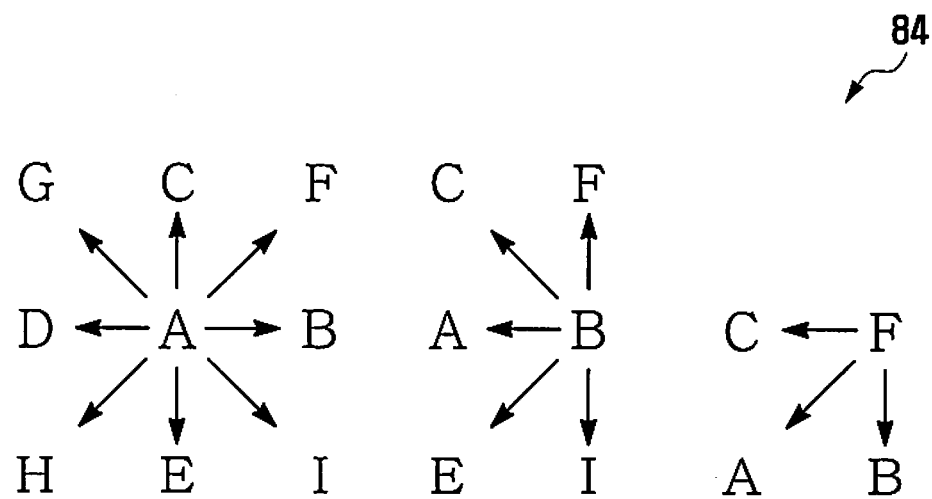

FIG. 5A illustrate circular screen switching between the idle screens arranged in a cross shape in FIG. 4A. FIG. 5B illustrate circular screen switching between the idle screens arranged in a grid shape in FIG. 4B. FIG. 5C illustrate non-circular screen switching between the idle screens arranged in a cross shape in FIG. 4A. FIG. 5D illustrate non-circular screen switching between the idle screens arranged in a grid shape in FIG. 4B.

Figure 6:
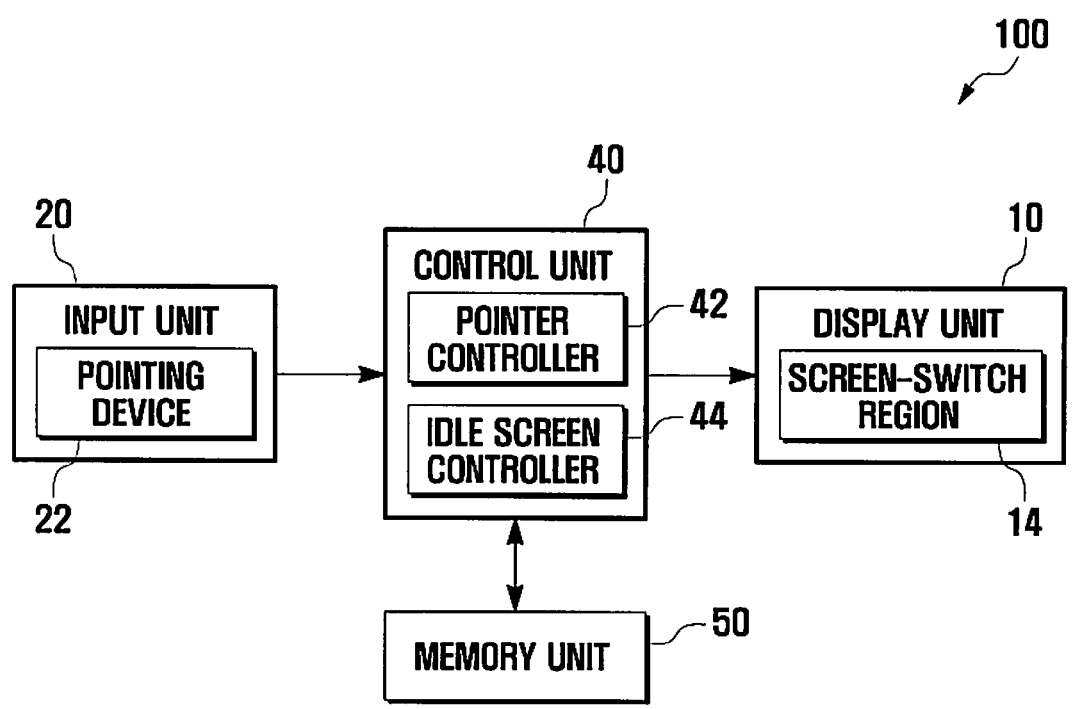
FIG. 6 illustrates a configuration of the mobile terminal of FIG. 1.

FIG. 6 illustrates a configuration of the mobile terminal 100 of FIG. 1.

Referring to FIG. 6, the mobile terminal 100 includes a control unit 40 and memory unit 50 in addition to the display unit 10 and input unit 20. As described above, the display unit 10 includes the screen-switch region 14, and the input unit 20 includes the pointing device 22. The pointing device 22 detects movement of the user's fingers, and sends a displacement value resulted from the finger movement to the control unit 40.

The control unit 40 controls the overall operation of the mobile terminal 100. In particular, the control unit 40 includes a pointer controller 42, and an idle screen controller 44. The pointer controller 42 receives a displacement value from the pointing device 22, and controls movement of the pointer 12 (FIG. 1) on the basis of the received displacement value. The idle screen controller 44 checks whether a displacement value from the pointing device 22 indicates a screen-switch event, and switches an idle screen displayed on the display unit 10 to another idle screen if the displacement value indicates a screen-switch event.

The memory unit 50 stores various executable programs and associated data. In particular, the memory unit 50 stores programs for driving the pointer controller 42 and the idle screen controller 44, and data regarding individual idle screens. The idle screen data may include an idle screen arrangement structure, a screen-switching scheme, coordinates of idle screens, images constituting idle screens, and shortcuts attached to idle screens.

Figure 7:
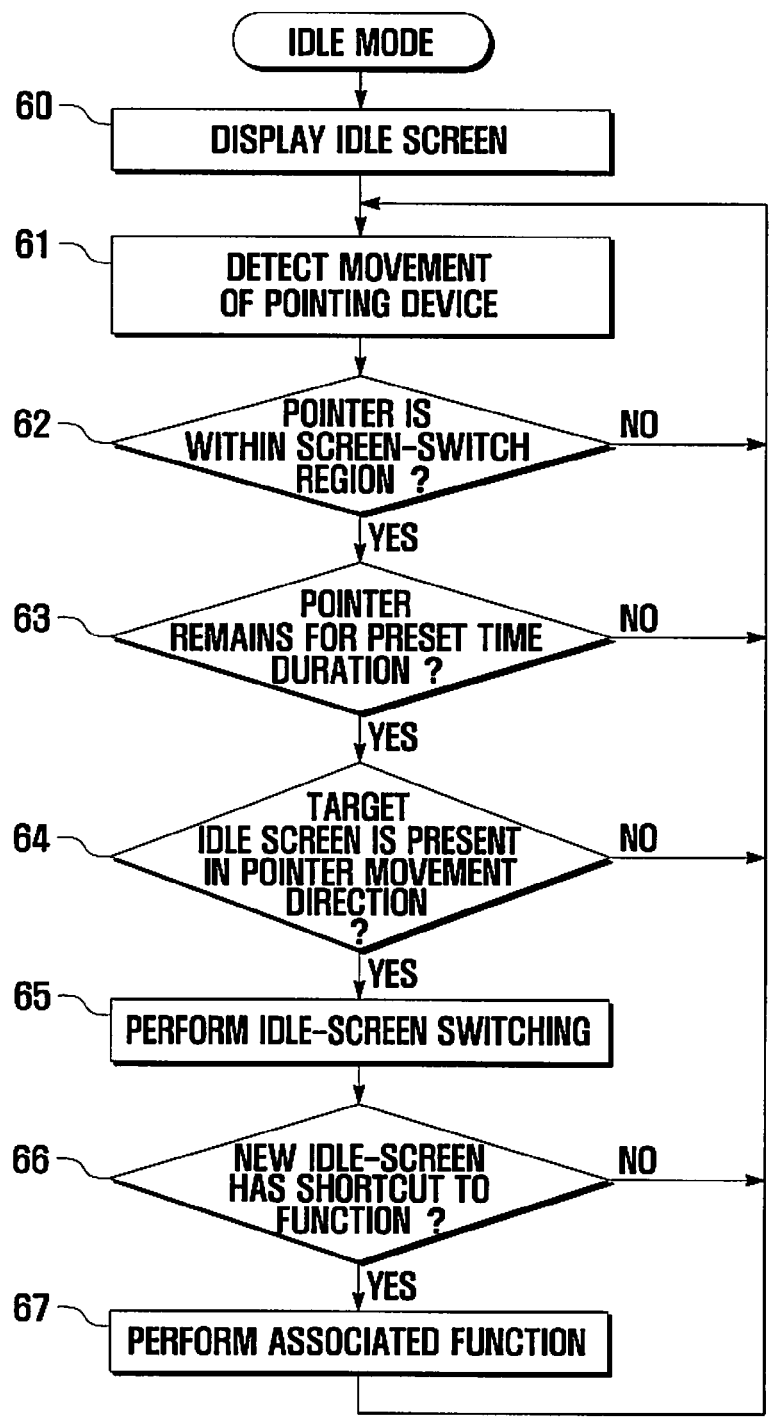
FIG. 7 is a flow chart illustrating the idle screen display method of FIGS. 2A and 2B.

FIG. 7 is a flow chart illustrating the idle screen display method of FIGS. 2A and 2B.

Referring to FIGS. 2A, 2B, 6 and 7, in an idle mode, the idle screen controller 44 of the control unit 40 displays an idle screen 30a on the display unit 10, in step 60. The idle screen 30a may be a base idle screen or an extended idle screen.

The pointer controller 42 of the control unit 40 detects movement of the pointing device 22, in step 61. That is, the pointing device 22 monitors movement of the user's fingers, and sends a displacement value resulted from the finger movement to the pointer controller 42. The pointer controller 42 receives the displacement value from the pointing device 22, and controls movement of the pointer 12 on the display unit 10 using the received displacement value.

The idle screen controller 44 checks, using a displacement value from the pointing device 22 or pointer controller 42, whether the pointer 12 is moved into the screen-switch region 14, in step 62. The screen-switch region 14 is provided at a border area on the display screen of the display unit 10.

If the pointer 12 is within the screen-switch region 14, the idle screen controller 44 determines whether the pointer 12 has remained in the screen-switch region 14 for a preset time duration, in step 63. Here, to prevent an undesired idle screen switching due to inadvertent pointer movement, a screen-switch event is generated only when the pointer 12 has remained in the screen-switch region 14 for the preset time duration.

If the pointer 12 has remained in the screen-switch region 14 for the preset time duration, the idle screen controller 44 determines whether a target idle screen is arranged in the movement direction of the pointer 12, in step 64. That is, the idle screen controller 44 reads the idle screen data from the memory unit 50, identifies the idle screen arrangement structure and screen-switching scheme, and checks whether an idle screen is arranged in the pointer movement direction. For example, referring to one of FIGS. 5A to 5D, if an idle screen 'F' is the current idle screen and the pointer movement direction is 'up', the idle screen controller 44 checks whether the idle screen arrangement structure is a cross shape or grid shape. Then, the idle screen controller 44 checks whether the screen-switching scheme is circular or non-circular. Finally, the idle screen controller 44 selects a target idle screen in the pointer movement direction.

If a target idle screen is arranged in the movement direction of the pointer 12, the idle screen controller 44 switches the current idle screen from the idle screen 30a to a target idle screen 30b, in step 65. That is, the idle screen controller 44 reads the idle screen 30b from the memory unit 50, and displays the idle screen 30b instead of the idle screen 30a on the display unit 10. After idle screen switching, the pointer controller 42 can place the pointer 12 at the central region of the new idle screen 30b as in FIG. 2B.

The idle screen controller 44 checks whether the new idle screen 30b in display has a shortcut to a function, in step 66. If the new idle screen 30b in display has a shortcut to a function (for example, camera photographing), the control unit 40 performs the function (camera photographing), in step 67.

As described above, if the user links frequently used functions to idle screens using shortcuts, the user can easily access a desired menu item associated with a frequently used function. In addition, idle screens having shortcuts to functions can be effectively utilized through multi-tasking. For example, the user can first display an idle screen associated with a music player and listen to music, then perform idle screen switching to another idle screen associated with text messaging and transmit a text message, and then perform idle screen switching to another idle screen associated with an electronic dictionary and look up a definition in the electronic dictionary.

Figure 8:
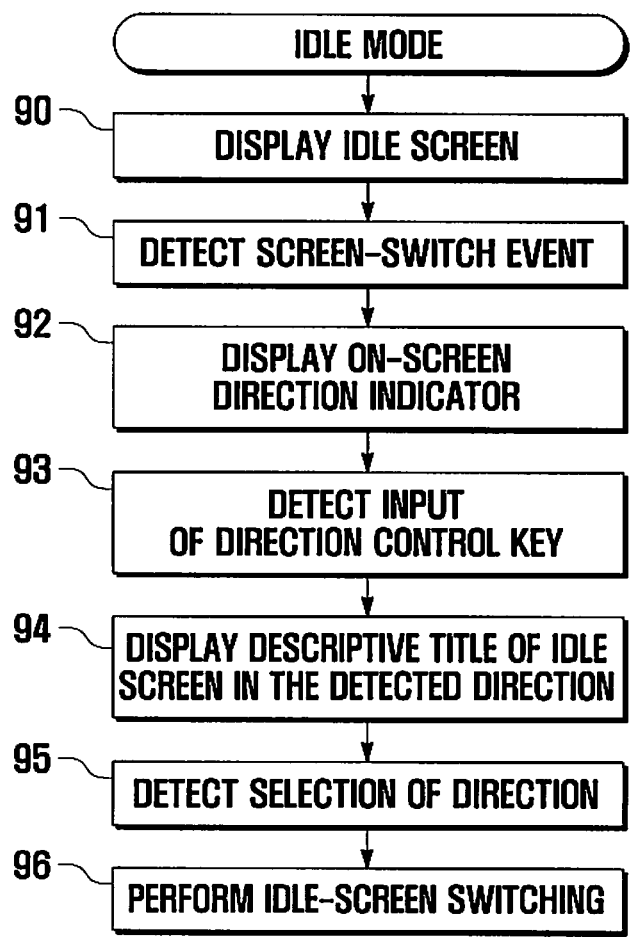
FIG. 8 is a flow chart illustrating an idle screen display method according to another exemplary embodiment of the present invention.

FIG. 8 is a flow chart illustrating an idle screen display method according to another exemplary embodiment of the present invention. FIGS. 9A to 9D illustrates the idle screen display method of FIG. 8. In the present embodiment, instead of a pointing device, a four way navigation key and on-screen direction indicator are used.

Figure 9A:
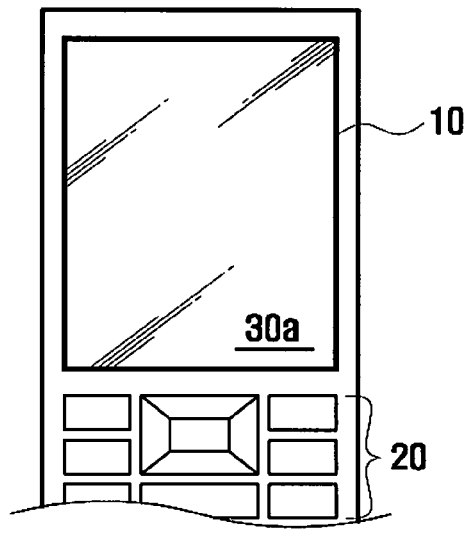
FIGS. 9A to 9D illustrates the idle screen display method of FIG. 8.

Referring to FIG. 8, in an idle mode, the control unit 40 displays an idle screen 30a on the display unit 10 as illustrated in FIG. 9A, in step 90. The idle screen 30a may be a base idle screen or extended idle screen.

Figure 9B:
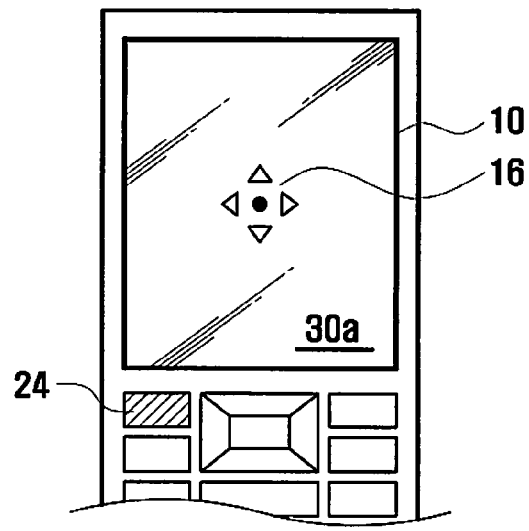

When the control unit 40 detects a screen-switch event, in step 91, the control unit 40 displays an on-screen direction indicator 16 as illustrated in FIG. 9B, in step 92. At step 91, a screen-switch event is generated in response to an input of a function key 24 mapped to screen switching by the user.

Figure 9C:
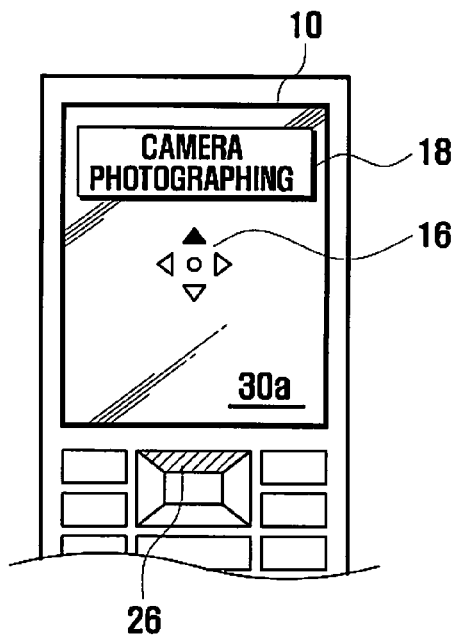

As illustrated in FIG. 9C, in response to an input of a direction control key 26, the control unit 40 recognizes the direction corresponding to the direction control key 26, and marks the direction using the on-screen direction indicator 16, in step 93. The control unit 40 also displays a descriptive title 18 of an idle screen arranged in the recognized direction in the form of a pop-up window, in step 94. For example, if a navigation 'up' key 26 is pressed and an idle screen associated with camera photographing is arranged in the 'up' direction, a descriptive title 'camera photographing' 18 is displayed above the on-screen direction indicator 16 on the display unit 10.

Figure 9D:
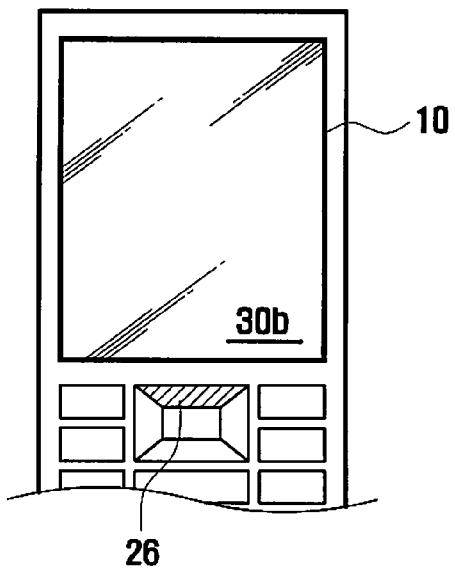

In response to another input of the same direction control key 26, the control unit 40 recognizes a selection of the direction corresponding to the direction control key 26, in step 95, and switches the current idle screen from the idle screen 30a to an idle screen 30b associated with camera photographing as illustrated in FIG. 9D, in step 96.

In the present embodiment, a descriptive title 18 of an idle screen arranged in the direction indicated by an input direction control key is displayed before the final selection of the idle screen in order to inform the user of the presence of the idle screen. Actual idle screen switching is performed when another input of the same direction control key is detected after the display of the descriptive title 18.

Alternatively, when the on-screen direction indicator is displayed in response to a detection of a screen-switch event, descriptive titles of available idle screens may be simultaneously displayed before a direction selection. If a pointing device is available in the input unit 20, pressing of the pointing device can be interpreted as generation of a screen-switch event, and the pointing device instead of the navigation key can be used for a selection of an idle screen.

Figure 10:
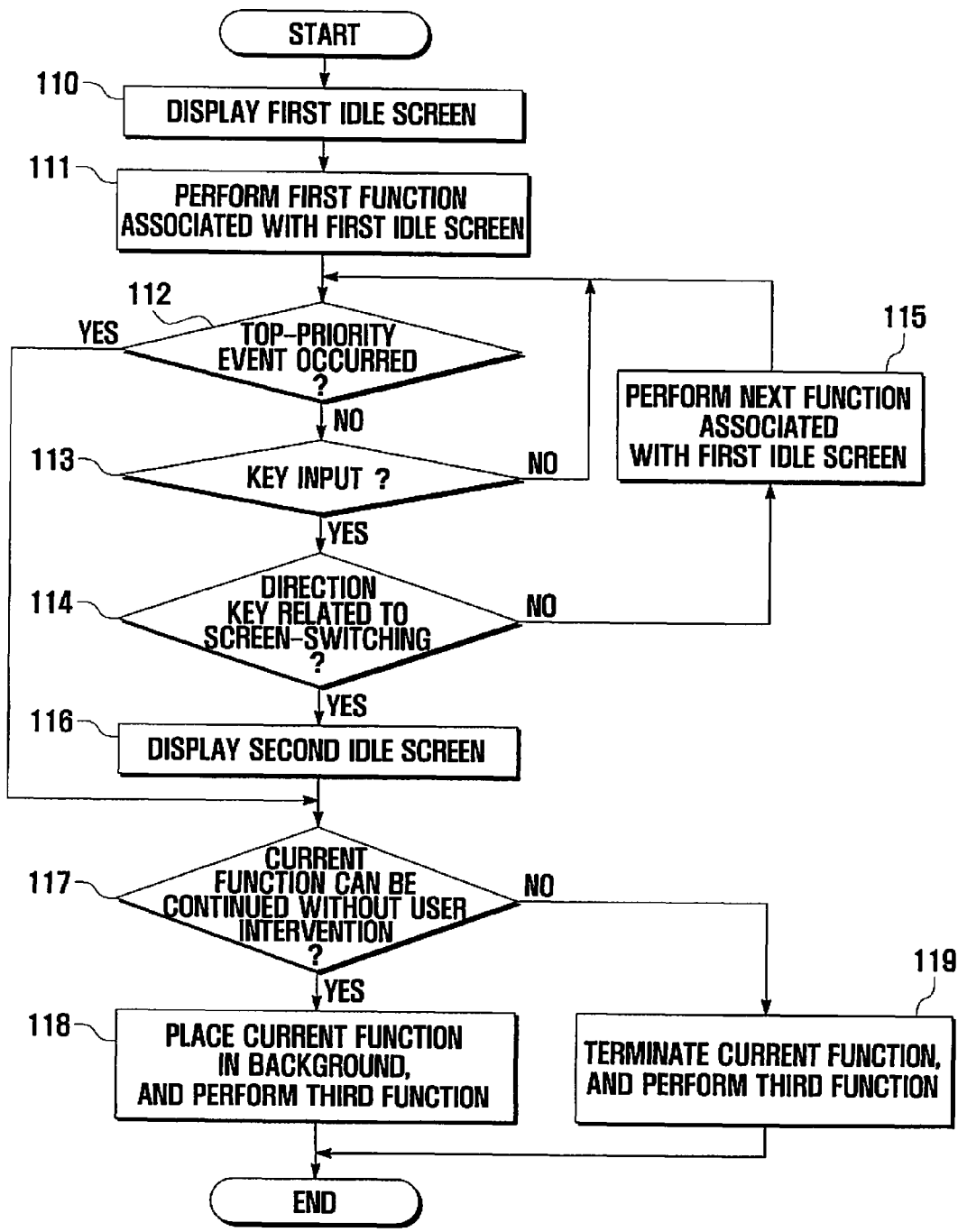
FIG. 10 is a flow chart illustrating an idle screen display method according to another exemplary embodiment of the present invention.

FIG. 10 is a flow chart illustrating an idle screen display method according to another exemplary embodiment of the present invention. In the present embodiment, idle screens have associated functions through shortcuts. The present embodiment may also be applicable to idle screens without shortcuts.

Referring to FIG. 10, the control unit 40 displays a first idle screen on the display unit 10, in step 110, and performs a first function associated with the first idle screen, in step 111. If the first idle screen has no associated function, a different function can be selected using a pointing device 22 or a direction control key and be performed as the first function.

During execution of the first function associated with the first idle screen, the control unit 40 determines whether an occurrence of a top-priority event is detected, in step 112. A top-priority event corresponds to an incoming call, incoming message or alarm, and takes precedence over the currently running application, function, or operation.

If an occurrence of a top-priority event is not detected, the control unit 40 determines whether a key is input, in step 113. If a key is not input, the control unit 40 continues to execute the first function. If a key is input, the control unit 40 determines whether the input key is a direction control key related to a screen-switch event, in step 114.

If the input key is not a direction control key related to a screen-switch event, the control unit 40 performs a second function associated with the first idle screen, in step 115. For example, if the first idle screen has a shortcut to a 'music play' application, a first function of the 'music play' application can be a 'play' function and a second function can be a 'rewind' function. If the application has multiple associated functions, the control unit 40 may perform an additional step to select a function to be executed.

If the input key is a direction control key related to a screen-switch event, the control unit 40 displays a second idle screen arranged in the direction indicated by the direction control key, in step 116. The control unit 40 determines whether the current function in execution (a function associated with the first idle screen) can be continued without user intervention, in step 117. In addition, if an occurrence of a top-priority event is detected at step 112, the control unit 40 also performs step 117. Functions that can be continued without user intervention may be specified in advance during a manufacturing process of the mobile terminal or by the user.

If the current function in execution can be continued without user intervention, the control unit 40 places the current function in execution in the background, and starts a third function (namely, a function associated with the second idle screen or a function related to a top-priority event), in step 118. For example, if the current function in execution is 'music playing' and the top-priority event is reception of an incoming call, the function 'music playing' is continued while the call is processed. Many other functions may be performed using multi-tasking.

If the current function in execution cannot be continued without user intervention, the control unit 40 terminates the current function in execution, and starts a third function (namely, a function associated with the second idle screen or a function related to a top-priority event), in step 119.

As apparent from the above description, the present invention provides an idle screen arrangement structure and an idle screen display method for a mobile terminal. The user can easily change idle screens through pointer movement without tedious manipulation of menu items. The idle screens can have shortcuts to frequently used applications, and switching between the idle screens can be associated with multi-tasking, thereby enabling effective utilization of the idle screens and the display screen limited in size. In addition, because frequently used applications can be activated using the idle screens, the number of shortcut keys or function keys can be reduced. Hence, a mobile terminal can be simplified in structure and the user can easily use the mobile terminal.

While exemplary embodiments of the present invention have been shown and described in this specification, it will be understood by those skilled in the art that various changes or modifications of the embodiments are possible without departing from the spirit and scope of the invention as defined by the appended claims.

What is claimed is:

1. A mobile terminal with an idle screen arrangement structure, the idle screen arrangement structure comprising:
    a base idle screen;
    a plurality of different extended idle screens arranged around the base idle screen; and
    a pointer, wherein a border region of the display unit is pre-assigned as a screen switch region, the pointer being freely movable and displayed on the display unit, displaying during an idle state one base idle screen and the extended idle screens on the display unit, and performing a screen-switch event generated by a moving direction of the pointer into the screen-switch region, another base idle screen and the extended idle screens different from the one idle screen and in the movement direction of the pointer is displayed instead of the one idle screen, and
    wherein the extended idle screens comprise a plurality of different first extended idle screens arranged in four directions of 'up', 'down', 'left' and 'right' around the base idle screen, and a plurality of different second extended idle screens arranged in four directions of 'upper left', 'upper right', 'lower left' and 'lower right' around the base idle screen.

2. The mobile terminal of claim 1, wherein at least one of the idle screens has a shortcut to a particular function.

3. The mobile terminal of claim 1, wherein the idle screens are switched among one another in a circular manner or a non-circular manner in response to the screen-switch events.

4. A mobile terminal with an idle screen arrangement structure, the idle screen arrangement structure comprising:
    a first idle screen arranged at a position (0, 0);
    at least two second idle screens arranged at positions (x, 0), where x is a non-zero integer;
    at least two third idle screens arranged at positions (0, y), where y is a non-zero integer; and
    a pointer, wherein a border region of the display unit is pre-assigned as a screen switch region, the pointer being freely movable and displayed on the display unit, displaying during an idle state one of the first to third idle screens on the display unit, and performing a screen-switch event generated by the moving direction of a pointer into the screen-switch region, another one of the first to third idle screens different from the one idle screen and in a movement direction of the pointer is displayed instead of the one idle screen, and
    wherein extended idle screens comprise a plurality of the second and third idle screens arranged in four directions of 'up', 'down', 'left' and 'right' around the first idle screen, and a plurality of different extended idle screens arranged in four directions of 'upper left', 'upper right', 'lower left' and 'lower right' around the first idle screen.

5. A mobile terminal, comprising:
    a plurality of idle screens arranged at positions (x, y), where $-m<x, y<m$ and x, y, m are integers; and
    a pointer, wherein a border region of the display unit is pre-assigned as a screen switch region, the pointer being freely movable and displayed on the display unit, displaying during an idle state one of the idle screens on the display unit, and performing a screen-switch event generated by a moving direction of the pointer into the screen-switch region, another one of the idle screens different from the one idle screen and in a movement direction of the pointer is displayed instead of the one idle screen, and
    wherein the plurality of idle screens comprise a base idle screen, a plurality of different first extended idle screens arranged in four directions of 'up', 'down', 'left' and 'right' around the base idle screen, and a plurality of different second extended idle screens arranged in four directions of 'upper left', 'upper right', 'lower left' and 'lower right' around the base idle screen.

6. An idle screen display method for a mobile terminal having a display unit, using an idle screen arrangement structure having a base idle screen, and a plurality of different extended idle screens arranged around the base idle screen, the method comprising:
    displaying, during an idle state, a first idle screen of the base idle screen and extended idle screens on the display unit, and pre-assigning a border region of the display unit as a screen-switch region;

checking whether a pointer is moved into the screen-switch region on the display unit; and if the pointer is moved into the screen-switch region, switching in a moving direction of the pointer the first idle screen to a second idle screen of the base idle screen and extended idle screens different from the first idle screen, generated by the moving direction of the pointer, wherein the extended idle screens comprise a plurality of different first extended idle screens arranged in four directions of 'up', 'down', 'left' and 'right' around the base idle screen, and a plurality of different second extended idle screens arranged in four directions of 'upper left', 'upper right', 'lower left' and 'lower right' around the base idle screen.

7. The idle screen display method of claim 6, further comprising checking whether the pointer remains in the screen-switch region for a preset time duration, and wherein if the pointer has remained in the screen-switch region for the preset time duration, the first idle screen is switched to the second idle screen.

8. The idle screen display method of claim 6, further comprising after the pointer movement into the screen-switch region, checking whether an idle screen is arranged in a direction of the movement of the pointer, and wherein if an idle screen is arranged in the direction of the movement of the pointer, the first idle screen is switched to the idle screen in the direction.

9. The idle screen display method of claim 6, further comprising:
after idle-screen switching, checking whether the second idle screen has a shortcut to a function; and
if the second idle screen has a shortcut to a function, performing the function.

10. The idle screen display method of claim 6, wherein the idle screens are switched among one another in a circular manner.

11. The idle screen display method of claim 6, wherein the idle screens are switched among one another in a non-circular manner.

12. An idle screen display method for a mobile terminal having a display unit, using an idle screen arrangement structure having a base idle screen, and a plurality of different extended idle screens arranged in four directions of 'up', 'down', 'left' and 'right' around the base idle screen, the method comprising:
displaying a first idle screen of the base idle screen and extended idle screens on the display unit;
displaying an on-screen direction indicator on the display unit indicating each direction in which idle screens are arranged according to the idle screen arrangement structure; and
when a direction selection is received, switching the first idle screen to a second idle screen of the base idle screen and extended idle screens different from the first idle screen, wherein the second idle screen is arranged in the selected direction,
wherein the extended idle screens comprise a plurality of different first extended idle screens arranged in four directions of 'up', 'down', 'left' and 'right' around the base idle screen, and a plurality of different second extended idle screens arranged in four directions of 'upper left', 'upper right', 'lower left' and 'lower right' around the base idle screen.

13. The idle screen display method of claim 12, further comprising:
receiving a direction selection of the on-screen direction indicator; and
displaying a description of a particular function to which an idle screen arranged in the selected direction indicated by the on-screen direction indicator has a shortcut.

14. The idle screen display method of claim 13, wherein displaying the description comprises:
in response to an input of a screen-switch event, displaying a description of a particular function to which each of the idle screens arranged in four directions around the on-screen direction indicator has a shortcut.

15. An idle screen display method for a mobile terminal having a display unit, using an idle screen arrangement structure having a first idle screen, and a plurality of different second idle screens, the method comprising:
displaying, during an idle state, an N-th idle screen of the first idle screen and second idle screens on the display unit;
performing a first function associated with the N-th idle screen;
displaying an M-th idle screen of the first idle screen and second idle screens different from the N-th idle screen on the display unit, generated by a moving direction of a control key during performance of the first function associated with the N-th idle screen; and
if the first function associated with the N-th idle screen is executable without user intervention, placing the first function in the background, and performing a first function associated with the M-th idle screen,
wherein the plurality of different second idle screens comprise a plurality of different first extended idle screens arranged in four directions of 'up', 'down', 'left' and 'right' around the first idle screen, and a plurality of different second extended idle screens arranged in four directions of 'upper left', 'upper right', 'lower left' and 'lower right' around the first idle screen.

16. The idle screen display method of claim 15, further comprising in response to an input of a key other than a direction control key during performance of the first function associated with the N-th idle screen, performing a second function associated with the N-th idle screen.

17. The idle screen display method of claim 15, further comprising if a top-priority event is detected during execution of a function associated with the N-th or M-th idle screen and the function in execution is executable without user intervention, placing the function in execution in the background, and performing another function related to the top-priority event.

18. The idle screen display method of claim 17, wherein the top-priority event is one of an incoming call, an incoming message, and an alarm.

19. The mobile terminal of claim 1, wherein the extended idle screens comprise a plurality of different first extended idle screens arranged in four directions of 'up', 'down', 'left' and 'right' around the base idle screen, and a plurality of different second extended idle screens arranged in four directions of 'upper left', 'upper right', 'lower left' and 'lower right' around the base idle screen.

* * * * *